Dec. 4, 1956  D. ROBERTS ET AL  2,772,641
ADJUSTABLE PARTITION FOR CARS, TRUCKS AND WAREHOUSES
Filed July 23, 1952  3 Sheets-Sheet 1

INVENTORS
DON ROBERTS
HAROLD HOCKENBURY

BY
Emery, Varney, Whiteman and Dix
ATTORNEYS

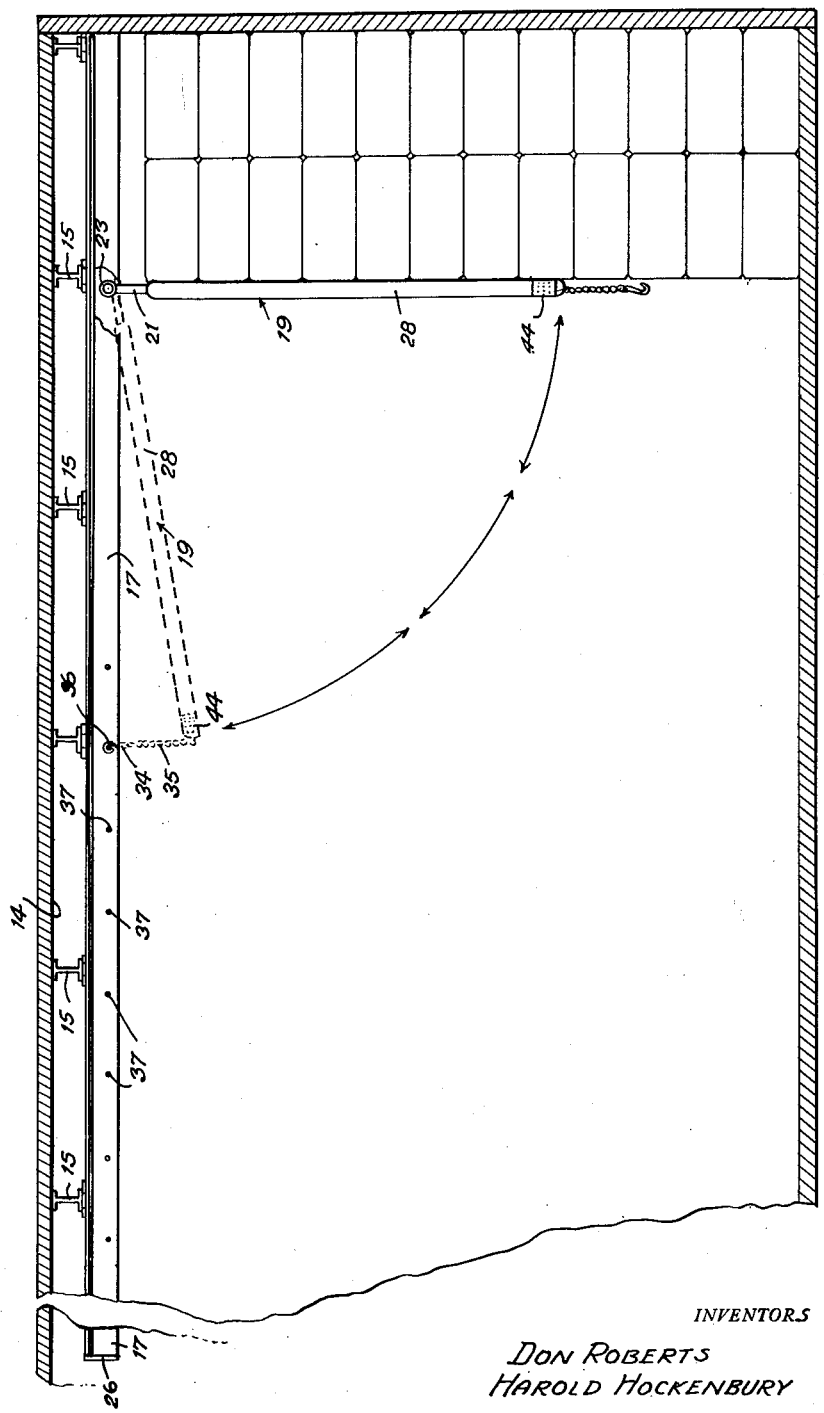

Dec. 4, 1956   D. ROBERTS ET AL   2,772,641
ADJUSTABLE PARTITION FOR CARS, TRUCKS AND WAREHOUSES
Filed July 23, 1952   3 Sheets-Sheet 3
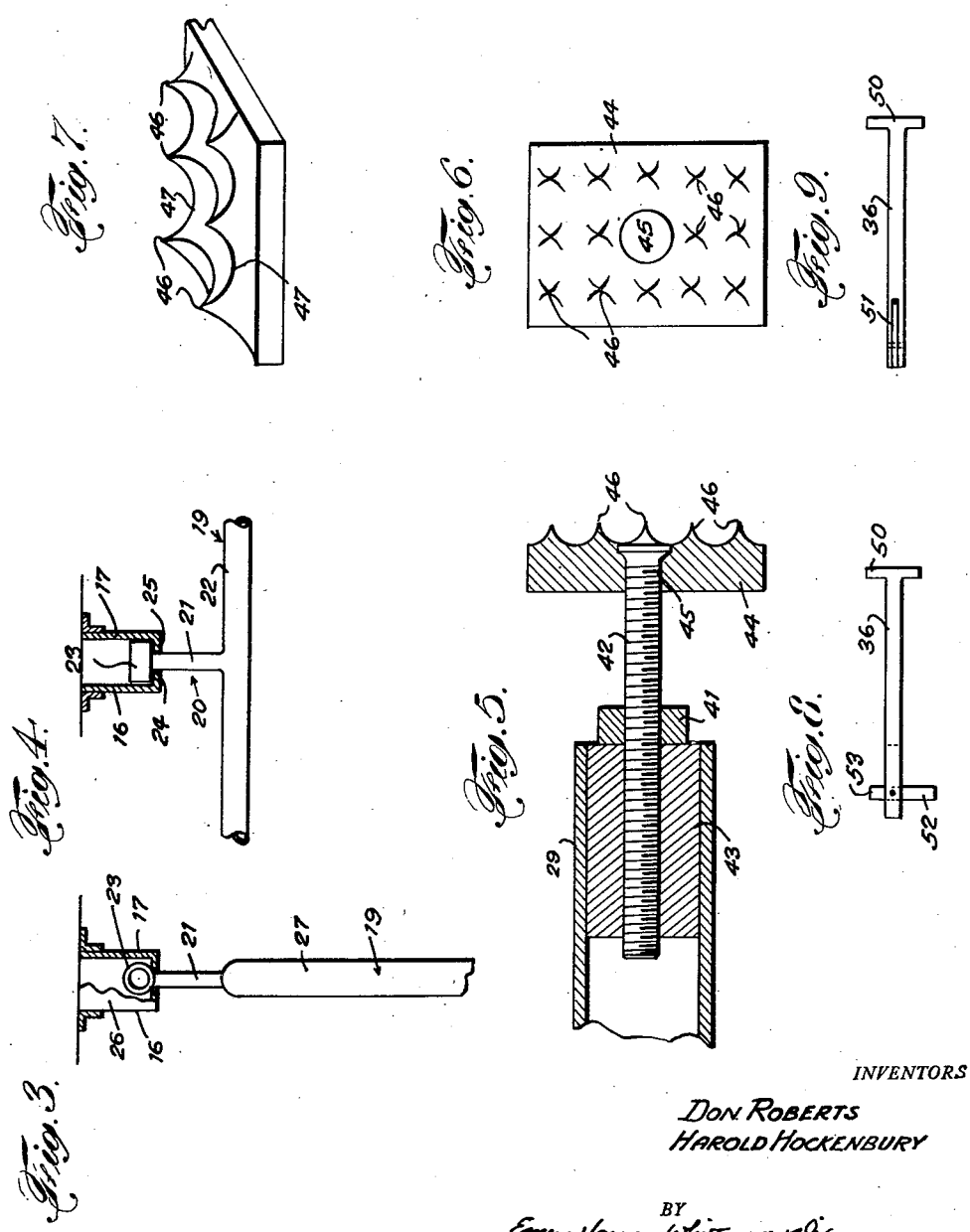
INVENTORS
DON ROBERTS
HAROLD HOCKENBURY
BY
Emery, Varney, Whittemore &Dix  ATTORNEYS

United States Patent Office 2,772,641
Patented Dec. 4, 1956

2,772,641

ADJUSTABLE PARTITION FOR CARS, TRUCKS AND WAREHOUSES

Don Roberts, Wilkes-Barre, and Harold Hockenbury, Forty Fort, Pa., assignors, by mesne assignments, to said Roberts Application July 23, 1952, Serial No. 300,402

2 Claims. (Cl. 105—369)

The present invention relates to an improved movable partition, and more particularly to a partition which is slidable and which may be easily adjusted into a predetermined holding position and fastened in that position.

The invention especially relates to a novel construction of a partition which is particularly adapted for use in trucks, freight cars, and warehouses, and the like, and is particularly efficient and advantageous to easily separate portions of a load, and to allow loading and unloading various quantities of merchandise.

Since it is desirable that the invention may be mainly used in trucks, freight cars, and warehouses, the present disclosure will be made to a preferred application to trucks and truck trailer bodies.

Normally, a truck is fully loaded with the merchandise at the point of manufacture or at a distributing point. Usually part load deliveries are made from the truck at different points. It will, therefore, be seen that it is desirable to support any remaining partial loads in a manner to eliminate breakage or shifting around of the products or merchandise. However, it has been the custom to load a truck with merchandise so that the delivery made to the first customer enroute will be separated from the balance of the load by any known means such as ropes or a loose partition. The drivers of these trucks often forget to fasten the ropes or replace the temporary partition after the partial load at the rear end or middle of the truck has been removed so that when the truck proceeds on its way to deliver the remaining merchandise to the next customers, the jarring of the truck causes the merchandise to fall into the empty space in the truck left by the removal of the merchandise delivered to the first customer. If the merchandise happened to be crackers, glass, or the like, much breakage will result.

The present invention obviates these difficulties and disadvantages by providing a partition inside of the truck which cannot be lost, forgotten or stolen, and preferably to movably affix the partition to the truck body at a desired position.

One of the main features of this invention is to provide an improved partition of relatively low cost, great strength, light weight, and movability. In addition, this partition is provided with means for fastening it in its adjusted position. When this improved partition is incorporated in a truck, it is preferably mounted so that the truck may be easily loaded and unloaded, and that the partition may then be moved to a desired position in the truck and quickly and tightly fastened.

Another feature of this novel partition is the incorporating in the partition of movable and adjustable parts to properly allow for the placing of the partition in any desired position and fastening it in the adjusted position.

A still further feature of this invention is to provide in a truck body an improved partition that is not removable from the body, except for repairs and the like, but which may be readily swung or moved to positions in the truck that do not interfere with the loading and unloading. Thus, the truck driver will not make a partial or full delivery and move on without the partition. Experience has heretofore shown that in making partial deliveries the drivers have removed the partitions from the truck body and placed them beside a building, and after completing the delivery have driven off without the partitions. With the improved invention herein, this type of loss of partition is eliminated.

The novel partition in its preferred form primarily comprises a frame substantially corresponding to the dimensions of the cross-section of the truck or car, or portion of a warehouse to which it is applied, and preferably made of pipe with a lattice work of strap metal or other suitable material secured to the frame so that the partition will not only be light in weight and easy to handle, but the remaining merchandise in the truck will be visible to the driver. The partition has a small T-pipe type of structure connected to the top rail of the frame and which structure engages and preferably slides in a suitable long support affixed to the top or roof of the truck. The T-structure between the roof support and the suspended partition permits the driver to readily slide the partition the full length of the truck.

The partition may also be turned at right angles or completely around on the T-structure to clear the way for loading and unloading the truck, or it may be swung upwardly, and fastened against the roof of the truck by a hook thrown over one of the pins in the roof support. After the truck is loaded the partition may be lowered from the roof and placed against the merchandise and fastened in position. If the truck is carrying only a partial load the partition is swung against the load and fastened.

Another feature of the improved partition is the incorporation therein of a fastening means for holding the partition from moving, once it is adjusted to holding position. This fastening means is preferably provided with gripping elements secured to each side or bottom of the partition near each side wall of the truck, and after the partition is properly placed these elements are moved to firmly engage the side walls of the truck.

Other objects, features, uses and advantages of the present invention will be obvious in the following disclosure.

Reference will be had to the accompanying drawings forming a part of this disclosure in which similar reference characters indicate corresponding parts throughout the several views, and in the drawings:

Fig. 2 is a longitudinal section through a portion of the truck shown in Fig. 1;

Fig. 3 is a fragmentary detail showing the partition parallel to the angle irons supporting the partition;

Fig. 4 is a fragmentary view showing the partition mounted at right angles to the angle irons;

Fig. 5 is a detail view of the fastening element which is mounted at each side of the frame of the partition;

Fig. 6 is a front view of the gripping member;

Fig. 7 is a perspective partly broken away, showing one form of the gripping surface of the fastening member;

Fig. 8 is a top plan view of a pin to be passed through holes in the supporting structure; and Fig. 9 is a view of the same pin shown in Fig. 8 but at 180° showing a slot in the end of the pin for the mounting of a holding member.

Figure 1:
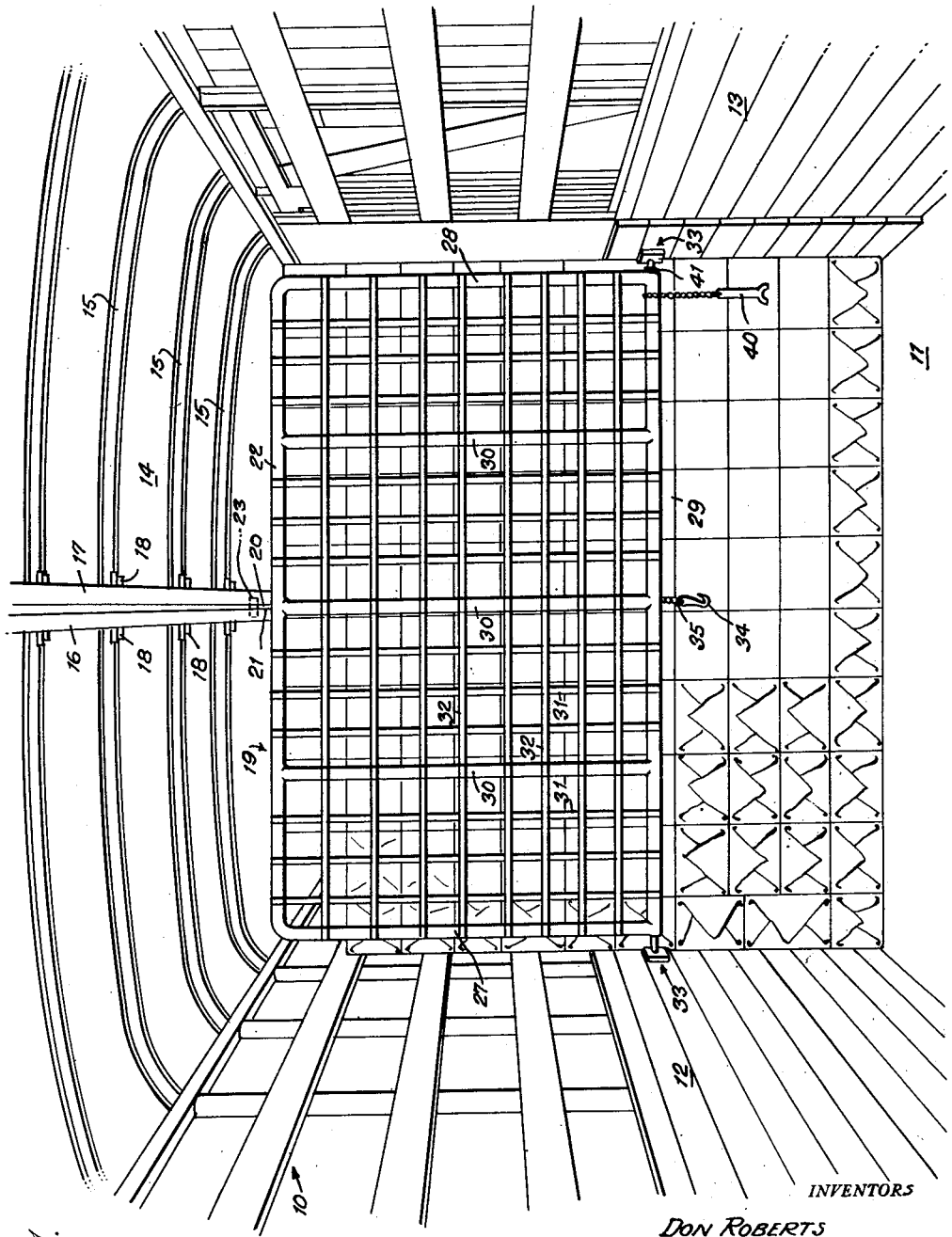
Fig. 1 is a perspective view looking into the rear end of a truck after the forward end of the truck has been loaded.

Referring to the drawings, wherein this invention is shown, by way of illustration merely, a truck 10 is shown as having a floor 11, side walls 12 and 13, and a roof or ceiling 14. In Fig. 1 the improved partition is shown as being against a series of cartons covered with paper. This illustration shows a partition which does not extend downwardly to the floor, but may do so. These packages or cartons are preferably of bakery products, and, therefore, are normally of the proportionate size illustrated in Fig. 1. When the partial load extends from the floor to substantially the ceiling, the lower packages are held in position by reason of the weights of the packages above. However, the height of the improved partition may be greater or less, depending upon the products being shipped.

The roof 14 is braced by a plurality of conventional beams 15 generally equally spaced apart throughout the length of the truck, and are positioned crosswise of the truck. A suitable support for carrying the partition is affixed to the body of the truck, and in this preferred structure the support is a pair of angle irons 16 and 17 running lengthwise of the truck, which are secured to the beams 15 in any suitable manner, such as by brackets 18 connecting the angle irons 16 and 17 with the beams 15.

A partition or bulkhead 19 is suspended from the angle irons 16 and 17 by a suitable T-bar member 20 having its vertical bar 21 secured, usually, to the middle of the top rail 22 of the partition 19 and its cross bar 23 riding on the lower flanges 24 and 25 of the angle irons 16 and 17.

The T-bar 20 is initially inserted between the angle irons 16 and 17 at the rear ends of the truck where a plate 26 or any other means, is then suitably secured to the ends of the angle irons 16 and 17 so that the partition can only be removed from the truck for repairs.

The improved partition primarily consists of a frame preferably of size that extends most of the width of the truck and may or may not extend down to the floor 11 of the truck. The frame is made preferably of pipe and has a top rail 22, side rails 27 and 28, a bottom rail 29, and vertical supports 30 secured as by welding or in any other suitable manner to the top and bottom rails 22 and 29, respectively.

A lattice work of preferably strap metal having the vertical straps 31 is secured to the top and bottom rails 22 and 29, and the horizontal straps 32 secured to the side rails 27 and 28 of the partition frame and they may be secured to the vertical frame supports 30.

The openings in the lattice are preferably smaller than the packages of merchandise usually transported so that no unauthorized person can remove any packages through the openings of the lattice.

Secured to the side rails 27 and 28 or to the bottom rail 29 of the partition and preferably adjacent the bottom thereof, is a clamping device 33 which fixes the position of the partition in the truck as hereinafter explained.

In operating the device when used in a truck, the partition 19 is normally fastened in a horizontal position from the roof of the truck, as shown in dotted lines in Fig. 2, by a hook 34 attached to the center of the bottom rail 29 of the partition by a chain 35.

The partition hook 34 may be inserted between the angle irons 16 and 17 and placed over a pin 36 which is passed through aligning holes 37 in the angle irons 16 and 17. If desired the hook 34 may be hooked into other members of the truck body such as onto the cross beams 15.

A series of holes 37 is spaced along the angle irons 16 and 17 relatively close to each other so that the partition may be easily positioned and held in any part of the truck body. The pin 36 can be easily removed from the holes by a man standing on the floor of the truck, but the construction of the pin is such that it cannot easily be removed by the jarring of the truck in transit, as noted in Figs. 8 and 9. Referring now to these Figs. 8 and 9, the pin 36 is provided with a head 50, and a slot 51 in the other end thereof, and a bar 52 which is pivoted in the slot. It will be noted that the bar 52 normally hangs down as noted in Fig. 8. However, when the pin 36 is moved through the holes 37, the lower end of the bar will be forced into the slot 51 and the upper end 53 of the bar is short and chamfered so that as the pin moves into one of the holes, the bar will automatically level itself with the longer axis of the pin 36. After passing through the last hole in the angle irons, the bar will drop and thus will normally prevent the pin from jarring out of its position.

Assuming the truck is loading up for five deliveries, the operation is as follows:

The partition is now hung against the roof of the truck near the rear of the truck, and the truck is then loaded with four deliveries in stop sequence. The man then lowers the partition against the rear of the merchandise comprising the four deliveries by sliding the T-bar and partition along the angle irons 16 and 17 until the partition is firmly up against the merchandise of the four deliveries. The pin 36 is then passed through the nearest set of holes in the angle irons at the back of the T-bar member 20 and the bar 52 drops down to its normal gravity position. The driver then moves a contact in the form of plate 44 against the body structure of the truck, thus to have the contact plate hold another part of the partition from moving or swinging and thereby to have the pin and contact cooperate to hold the partition in predetermined position. This contact plate, in the preferred form herein, is moved by rotating the nut 41 on the left hand side of the truck. Likewise, when there is another contact plate as shown herein, the driver does the same for the nut 41 at the right hand end of the rail 29, to force the other "cat's paw" against the side of the truck. The driver then takes the wrench 40 and rotates the nut 41, see Fig. 5, which is secured to a screw 42 threaded to a fixed bushing 43 inside of the lower rail pipe 29 at the lower end of the partition 19 and at each end thereof. The "cat's paw" plate 44 is preferably rotatably secured at 45 to the outer end of the screw 42. Thus, rotating the nuts 41 causes the plates 44 to impinge against the side walls 12 and 13. The working surface of the plate 44 preferably has a number of sharp points 46 formed by the cusps 47. The points 46 effect a strong grip on the walls 12 and 13 and will hold against a considerable amount of weight in transit.

After the partition is firmly in place behind the four deliveries, the fifth delivery is then placed in the truck.

After the first delivery is made, and the second delivery is to be unloaded, the partition is released by unfastening the plates 44, and then hung up on the ceiling until the second delivery is made, whereupon the partition is then lowered and placed against the remaining merchandise and so on until the truck is empty.

By reason of the spacing between the lower ends of the angle irons 16 and 17 being of less width than the diameter of the T-bar 23, the partition may be rotated 90° and the unloading done by passing the merchandise at the sides of the partition to the end or side doors of the truck. This arrangement permits the temporary repositioning of the partition for unloading instead of swinging the partition to the ceiling.

It will be noted from the foregoing description that a novel light weight, stong, and flexibly positioned partition has been provided so that it will remain in the truck at all times, and when not in use may be moved to a noninterfering position during loading and unloading, and may thereafter be quickly moved against the remaining merchandise or products in the truck and quickly fastened in position to eliminate any material movement of the products still in the truck.

It will be further noted that the structure of the partition and its cooperating parts for supoprting it and for fastening it in adjused position give easy operation and permit the partition to be readily employed as long as there is at least a 3-point support or attachment. Also, it will be noted that the partition may be readily employed in railway cars or in warehouses or furniture storage compartments, or in other places where a light weight, easily movable partition of low cost will perform the function of holding products or merchandise in a particular piled or assembled relation.

It will be noted that the disclosure herein mentions the use of the improved partition for holding stored merchandise in a warehouse. This may be easily accomplished by providing a room in a warehouse with the angle irons along the ceiling and the mounting of the partition therein and have the "cat's paw" plate engage the sides of the room for holding the stored goods or merchandise. Likewise, when storing goods or merchandise on the floor of a warehouse, four of these partitions may be employed on four sides of the piled merchandise and the fastening plates strapped together and provide cross trolley supports at the top with holes therein so that the top support of each partition may be fastened in the cross trolley support and thereby hold the piled goods or merchandise in predetermined positions by having the partitions cooperate with each other and with a top cross trolley support.

It will be understood that various modifications and changes may be made in the preferred form of the invention herein, and such modifications and changes are to be understood as part of this invention, as outlined in the following claims.

The invention claimed is:

1. In a structure for use with trucks, freight cars or warehouses to hold partial or whole loads of stored merchandise in predetermined positions, a movable partition, a support positioned above the storage space, and a track secured to said support comprising two longitudinal angle members held in fixed relation to each other with a narrow longitudinal slot between the lower flanges thereof, and a connecting element between said track and said partition, said connecting element including a T-shaped member having laterally extending arms adapted to rest on the upper surface of the lower flanges of said track angle members and longer than the width of said slot and too thick to pass through said slot, the vertical element of said T-shaped member having a thickness with respect to the width of said slot as to permit said T-shaped member to be rotated in said slot, and said T-shaped member being rigidly connected to said arms thereof and connected to said partition and said T-shaped element being capable of rocking on said arms resting on the flanges of said track and said vertical element extending downwardly through said slot and free to slide lengthwise thereof.

2. In a structure for use with trucks, freight cars or warehouses to hold partial or whole loads of stored merchandise in predetermined positions, a movable partition, a support positioned above the storage space, and a track secured to said support comprising two longitudinal angle members held in fixed relation to each other with a narrow longitudinal slot between the lower flanges thereof, a connecting element between said track and said partition, said connecting element including a T-shaped member having laterally extending arms adapted to rest on the upper surface of the lower flanges of said track angle members and longer than the width of said slot and too thick to pass through said slot, the vertical element of said T-shaped member having a thickness with respect to the width of said slot as to permit said T-shaped member to be rotated in said slot, and said T-shaped member being rigidly connected to said arms thereof and connected to said partition and said T-shaped element being capable of rocking on said arms resting on the flanges of said track and said vertical element extending downwardly through said slot and free to slide lengthwise thereof, and means on the vertical edges of said partition to engage and anchor said partition to any walls adjacent the edges of the partition when said partition is at substantially right angles to said walls.

References Cited in the file of this patent

UNITED STATES PATENTS

| 1,152,630 | Hoffman | Sept. 7, 1915 |
| 1,396,564 | Fechner | Nov. 8, 1921 |
| 1,720,690 | Preble | July 16, 1929 |
| 1,868,638 | Mackey | July 26, 1932 |
| 1,897,594 | Shafer | Feb. 14, 1933 |
| 2,301,866 | Goodall | Nov. 10, 1942 |
| 2,340,374 | George | Feb. 1, 1944 |
| 2,360,029 | Wieden | Oct. 10, 1944 |
| 2,565,997 | Stone | Aug. 28, 1951 |
| 2,594,208 | Pilot | Apr. 22, 1952 |
| 2,624,292 | Sanford | Jan. 6, 1953 |